(12) United States Patent
Inns et al.

(10) Patent No.: US 8,539,843 B2
(45) Date of Patent: Sep. 24, 2013

(54) LOAD INDICATOR

(75) Inventors: Martyn Inns, Gloucester (GB); Steve Smith, Gloucester (GB)

(73) Assignee: Messier-Dowty Limited, Gloucester (GB)

( * ) Notice: Subject to any disclaimer, the term of this patent is extended or adjusted under 35 U.S.C. 154(b) by 256 days.

(21) Appl. No.: 12/678,970

(22) PCT Filed: Sep. 19, 2008

(86) PCT No.: PCT/GB2008/003187
§ 371 (c)(1),
(2), (4) Date: Jun. 29, 2010

(87) PCT Pub. No.: WO2009/037475
PCT Pub. Date: Mar. 26, 2009

(65) Prior Publication Data
US 2010/0257946 A1  Oct. 14, 2010

(30) Foreign Application Priority Data
Sep. 19, 2007  (GB) .................................. 0718296.7

(51) Int. Cl.
*G01L 5/13* (2006.01)

(52) U.S. Cl.
USPC ..................................................... 73/862.57

(58) Field of Classification Search
USPC ............................................. 73/862.57, 761
See application file for complete search history.

(56) References Cited

U.S. PATENT DOCUMENTS

| | | | | |
|---|---|---|---|---|
| 2,960,289 A | * | 11/1960 | Westcott, Jr. ............. | 244/104 R |
| 3,251,633 A | * | 5/1966 | Ezzat ................................ | 384/13 |
| 3,845,919 A | * | 11/1974 | Jenny ........................ | 244/103 R |
| 3,948,141 A | * | 4/1976 | Shinjo .............................. | 411/10 |
| 4,392,623 A | | 7/1983 | Munsen et al. | |

(Continued)

FOREIGN PATENT DOCUMENTS

| | | |
|---|---|---|
| DE | 33 43 495 | 9/1974 |
| RU | 2271526 C2 | 3/2006 |
| SU | 467246 A1 | 4/1975 |
| SU | 1658186 A1 | 6/1991 |

OTHER PUBLICATIONS

International Search Report for International Application No. PCT/GB2008/003187 mailed Feb. 2, 2009.

(Continued)

*Primary Examiner* — Andre Allen
*Assistant Examiner* — Octavia Davis-Hollington
(74) *Attorney, Agent, or Firm* — Marshall, Gerstein & Borun LLP

(57) ABSTRACT

A load indicator comprises a load bearing assembly of first and second load bearing members (23, 22) connected together to bear a lateral load applied to the first member (23), the first load bearing member defining a cavity (25) with the second load bearing member such that it is frangible above an indicator load, and the cavity (25) containing an indicator liquid which escapes from the cavity once the first load bearing member is fractured by said load. The load bearing members (22, 23) comprise cylindrical members arranged concentrically with the outer member (23) having a portion of reduced thickness to render it frangible and to define the cavity (25). The cavity (25) includes an internal volume within the second load bearing member (22). The load indicator may be configured as a load bearing pin to connect two components.

11 Claims, 5 Drawing Sheets

(56) References Cited

U.S. PATENT DOCUMENTS

| | | | | |
|---|---|---|---|---|
| 4,537,374 | A | * | 8/1985 | Barnoin et al. ........... 244/102 R |
| 4,869,444 | A | * | 9/1989 | Ralph ..................... 244/104 FP |
| 5,927,646 | A | | 7/1999 | Sandy et al. |
| 7,193,530 | B2 | * | 3/2007 | Nance .......................... 340/960 |
| 7,775,093 | B2 | * | 8/2010 | Cooper ........................... 73/129 |
| 2002/0029614 | A1 | | 3/2002 | Davey |
| 2010/0288878 | A1 | * | 11/2010 | Bennett .................. 244/104 FP |

OTHER PUBLICATIONS

First Office Action in CN Application No. 200880107790.6 dated May 3, 2012.
Russian Office Action for Application No. 2010115338/11, dated Aug. 14, 2012.
English translation of Russian Office Action for Application No. 2010115338/11, dated Aug. 14, 2012.
English translation of Decision on Grant for Application No. 2010115338, issued at least as early as Nov. 2012.
English translation of German Patent No. DE 3343495.
Examination Report for Application No. GB0718296.7, dated Apr. 19, 2011.
International Preliminary Report on Patentability for International application No. PCT/GB2008/003187, dated Mar. 24, 2010.
International Search Report for International application No. PCT/GB2008/003187, dated Feb. 2, 2009.
Search Report for Application No. GB0718296.7, dated Jan. 7, 2008.
Written Opinion of the International Searching Authority for International application No. PCT/GB2008/003187 dated Feb. 2, 2009.

* cited by examiner

LOAD INDICATOR

TECHNICAL FIELD

The present invention relates to a load indicator. Applications for the indicator include, but are not limited to, indicating a hard landing of an aircraft, and indication of excessive towing forces applied to an aircraft. The invention also relates to methods for inspecting an aircraft and inspecting an aircraft towing device.

BACKGROUND

The cost of an Aircraft on Ground (AOG), for whatever reason, is very significant and the airline operators look to the manufacturers where possible to reduce the impact of this by planned maintenance and/or clearance for further flight until the next scheduled maintenance point can be reached. However, there are events where planning cannot help. One such event is a "Hard Landing".

A "Hard Landing" occurs when, for whatever reason, the certified landing parameters are exceeded. This would normally be reported by the aircraft pilot and subsequently confirmed by inspection of the confirmed by inspection of the airframe structure and information extracted from the Digital Flight Data Recorder (DFDR). The problem lies in the time taken to analyse data confirm whether the event was truly a "Hard Landing" or not. This analysis can sometimes take up to 3 weeks to conclude and is not often tolerated by the aircraft operator.

U.S. Pat. No. 4,392,623 describes a fused connection adapted to fail under different overloads acting in different directions. The objective is to protect the fuel tank (primary wing structure) from rupture resulting from landing gear overload in either the vertical or horizontal directions.

U.S. Pat. No. 5,927,646 describes an energy absorbing landing gear/tail skid including means for indicating the magnitude of impact loads. Impact loads effect plastic deformation of the device, and an elongate stem protrudes beyond a reference surface to provide a visual indication that the magnitude of impact loads has reached a threshold value.

DISCLOSURE OF THE INVENTION

The invention consists in a load indicator comprising a load bearing assembly of first and second load bearing members connected together to bear a lateral load applied to the first member, characterised in that the first load bearing member defines a cavity with the second load bearing member such that it is frangible above an indicator load, and the cavity contains an indicator liquid which escapes from the cavity once the first load bearing member is fractured by said load.

The two components may comprise components of an aircraft landing gear including components of a side stay or drag stay or an articulation joint or a towing connection.

DESCRIPTION OF THE DRAWINGS

The invention will now be described by way of example with reference to the accompanying drawings, in which.

EMBODIMENTS OF THE INVENTION

Figure 1:
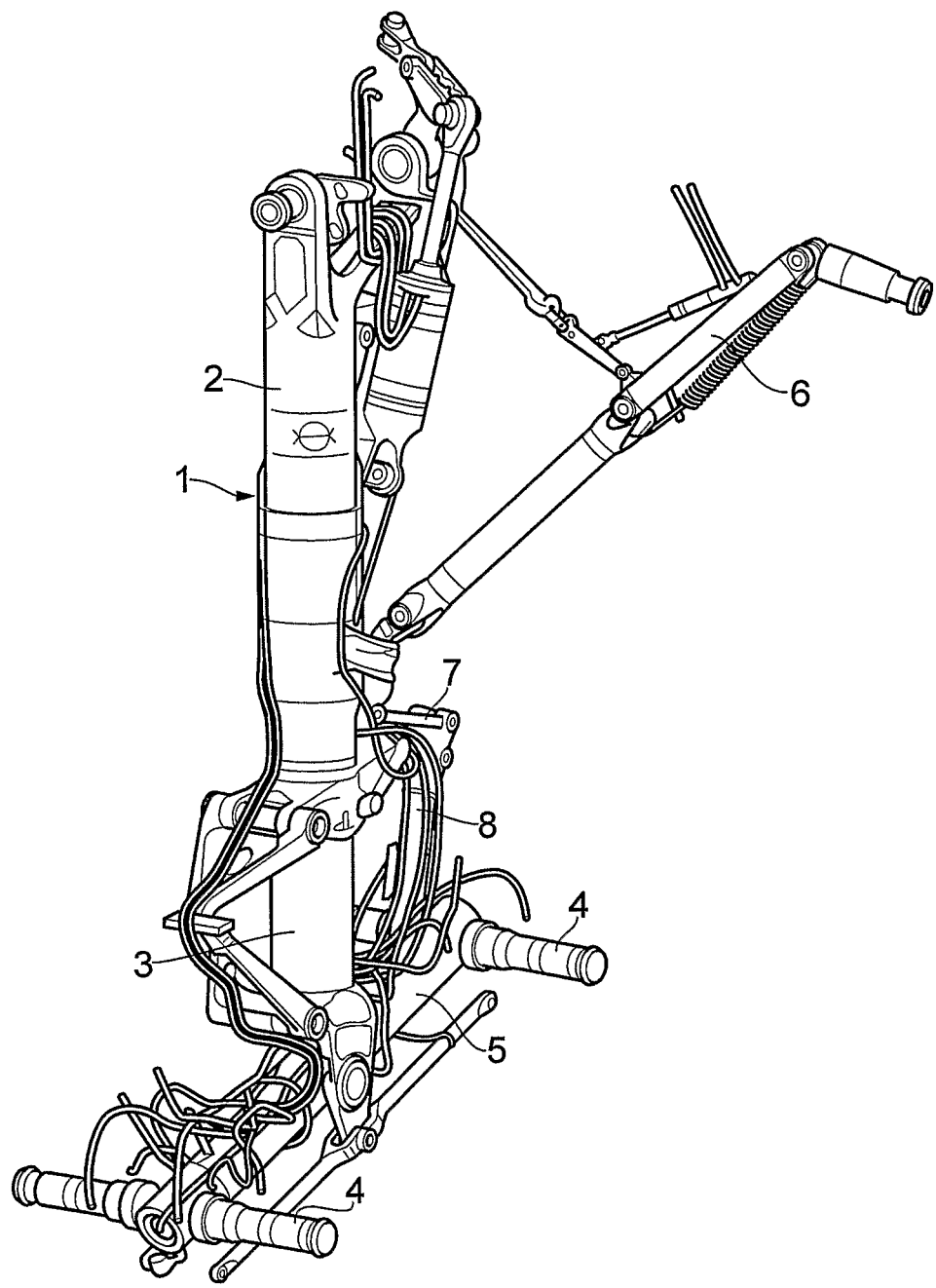
FIG. 1 is a view of an articulated landing gear.
Figure 2:
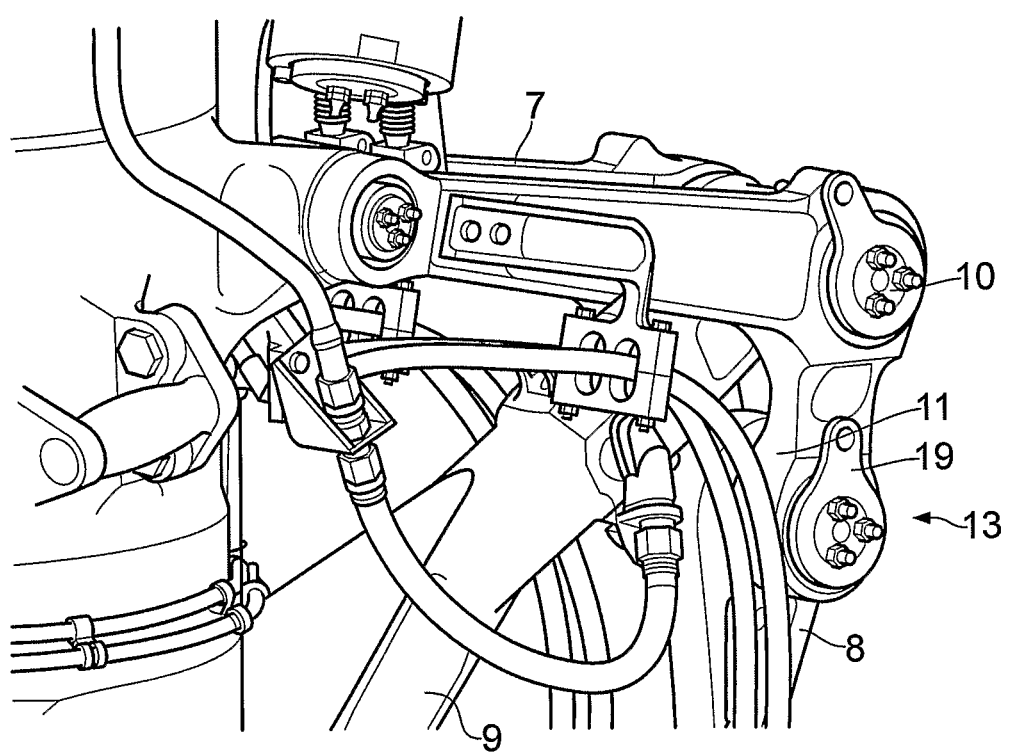
FIG. 2 is a view of an articulation link of the landing gear of FIG. 1.

FIG. 1 shows a landing gear of an aircraft comprising a shock absorber strut 1 with upper and lower telescoping portions 2, 3, the upper portion 2 being connectable to the airframe, the lower portion 3 carrying one or more axles 4 by means of attachment to a pivoted bogie beam 5. A hinged stay assembly 6 is connected between the upper portion of the shock absorber and the airframe and serves to stabilise the landing gear so that it may react load in the "down" position, yet is able to fold to allow the gear to retract.

Articulation links 7, 8 are connected between the forward part of the bogie beam 5 and the upper part 2 of the shock absorber to react tension and thereby form a fulcrum for the bogie beam during the early part of landing. The lower link 8 is attached between the forward part of the bogie beam 5 and the upper link 7, and the upper link 7 is attached between the lower link 8 and the upper part 2 of the shock absorber. A pitch trimmer 9 is mounted between the upper part 1 of the shock absorber and a point 10 on the upper articulation link 7 close to its attachment to the lower articulation link 8 and serves to act as a hydraulic spring/damper to hold the articulation links in a position. The net result is a linkage mechanism that resists tension of the lower link 8, but allows it to rise when a compression load is applied.

Figure 3:
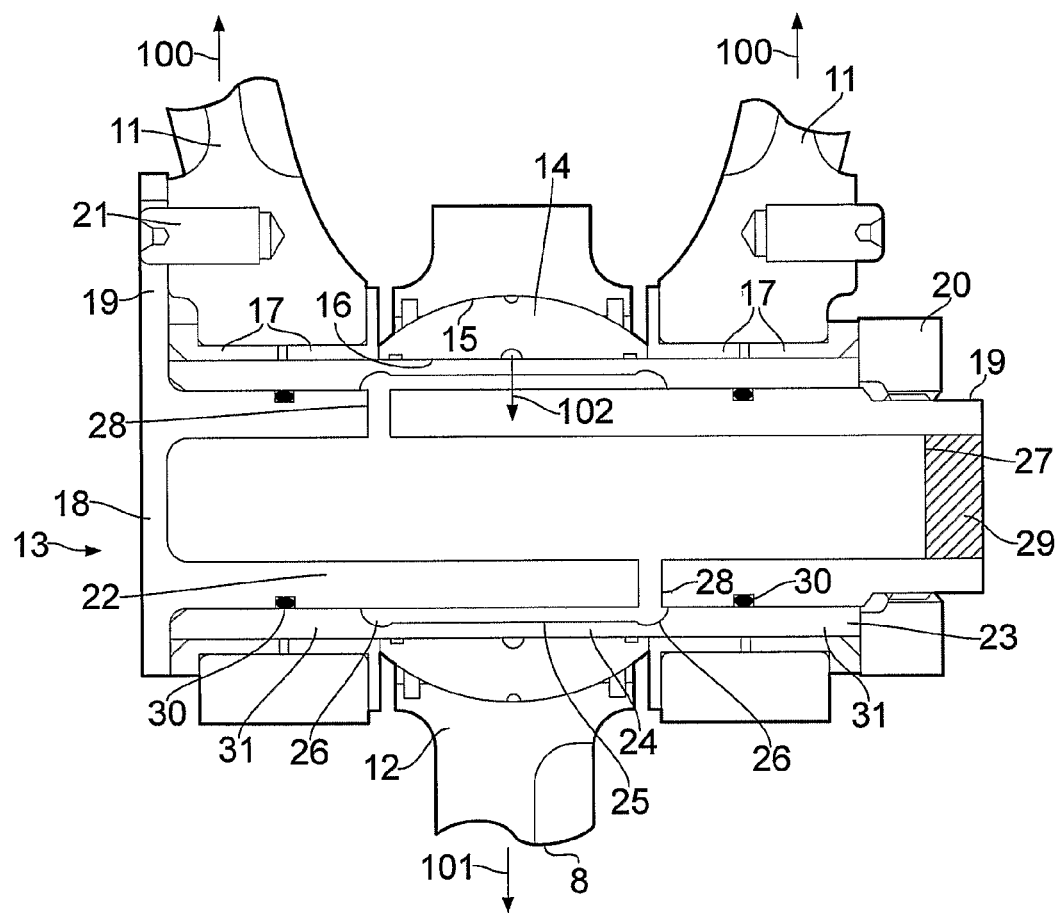
FIG. 3 is a cross section through a joint of the articulation link of FIG. 2.

The upper and lower links 7, 8 are connected by a pivotal joint 13 as shown in more detail in FIG. 3. The upper link 7 has a forked end with a pair of lugs 11, between which is received a single lug 12 at the end of the lower link 8. All three lugs have aligned bores with bearings to receive a pivot pin 13. The bearing between the lug of the lower link and the pin is a spherical bearing which is split to enable it to be assembled within a spherical cavity 15 within the lug. The inner surface 16 of the spherical bearing is cylindrical to receive the pin. The bearings within the outer lug comprise pairs of cylindrical bushes 17. The pivot pin has a head 18 at one end and a thread 19 at the other, and is inserted through the aligned bearings until the head 18 abuts the outer lug 11 at one end. A retaining nut 20 is then screwed onto the threaded portion of the pin extending from the second outer lug 11. The head 18 of the pivot pin has a radially extending flange 19 by which it is connected to the adjacent lug by a dowel 21 so as to restrain the pin from rotating.

The pivot pin 13 consists of an inner cylindrical member 22 which carries the head 18 at one end and the threaded portion 19 at the other end, and a frangible sleeve 23 that fits over the inner member 22 between the head and the threaded portion. Portions of the sleeve 23 at each end are a close fit on the inner member and form lands 31, and a portion of the sleeve 24 therebetween has a reduced thickness so that its inner surface is spaced away from the inner member 22 to create a chamber 25. This central portion of reduced thickness is aligned with the central lug 12 and spherical bearing 14 so that it is exposed to a load applied between the upper and lower links. The outer ends of the central portion 24 are formed with additional internal channels 26 so as to reduce the thickness of the sleeve even further so that fracturing of the frangible sleeve 23 under load is most likely to occur at these points.

The inner member 22 is formed with a blind bore 27 which is connected via radial passages 28 with the chamber 25 between the inner member and outer frangible sleeve. The whole of the volume of the bore 27 and chamber 25 and connecting passages 28 is filled with red dye and the open end of the bore is sealed by a plug 29. Ring seals 30 are provided between the inner member 22 and outer sleeve 23 at either end to prevent escape of red dye longitudinally therebetween.

On aircraft landing, the pivot pin 13 is subjected to landing forces. Specifically, the articulation link is subjected to a tensile load indicated by arrows 100 (indicating upwards forces applied to the lugs 11) and a downward force 101 subjected to the lug 12. This results in a downward force 102 being applied to the central portion 24 of the pivot pin by the lug 12 and bearing 14, and upwards forces 103 being applied to the outer ends of the pivot pin by the lugs 11.

When the force 102 exceeds a certain level, the pivot pin 13 fractures in the region of the grooves 26. This causes the red dye to be released from the cavity 25 and bleed out of the articulation link between the ends of the two links.

Thus, the pivot pin acts a shear pin and provides a simple, quick and accurate means of inspecting for reported cases of "hard landings". Also, the indication of a hard landing does not compromise aircraft safety or operation since the pivot pin 13 can continue to support landing loads even when the pivot pin has fractured. Inspection also requires no specialist tooling. Inspection should be possible within normal aircraft turnaround times—typically 4 hours.

Identification of a limit load excedance would be identified quickly following the aircrew reporting the event by simple inspection of the joint. This inspection can be carried out with the aircraft parked normally on the ground and with no additional or special equipment. Any lack of freedom in the joint would indicate a deformation of the pivot pin and hence quarantine the MLGs for further inspection or removal.

Figure 4:
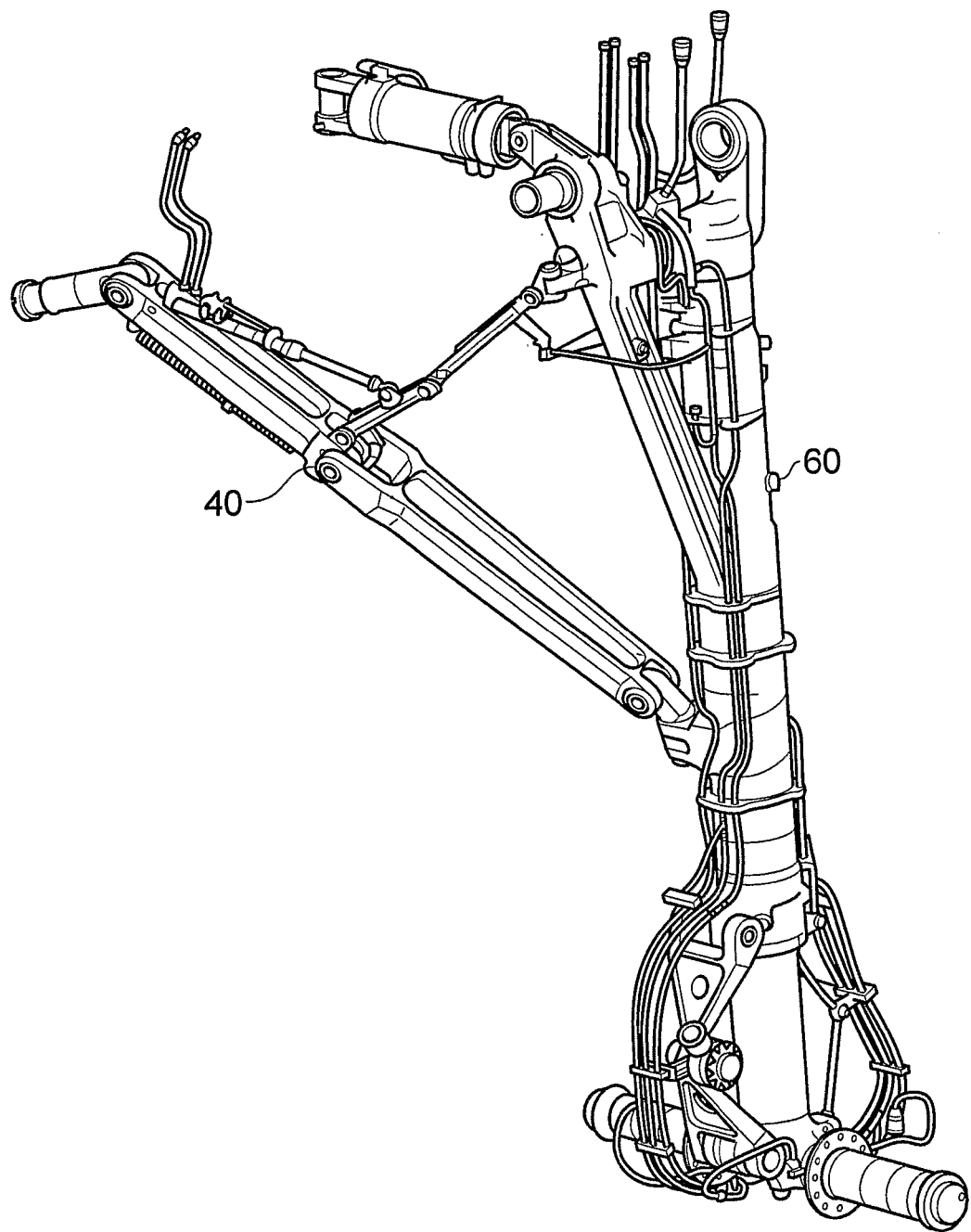
FIG. 4 is a view of another landing gear showing other potential applications of the invention.
Figure 5:
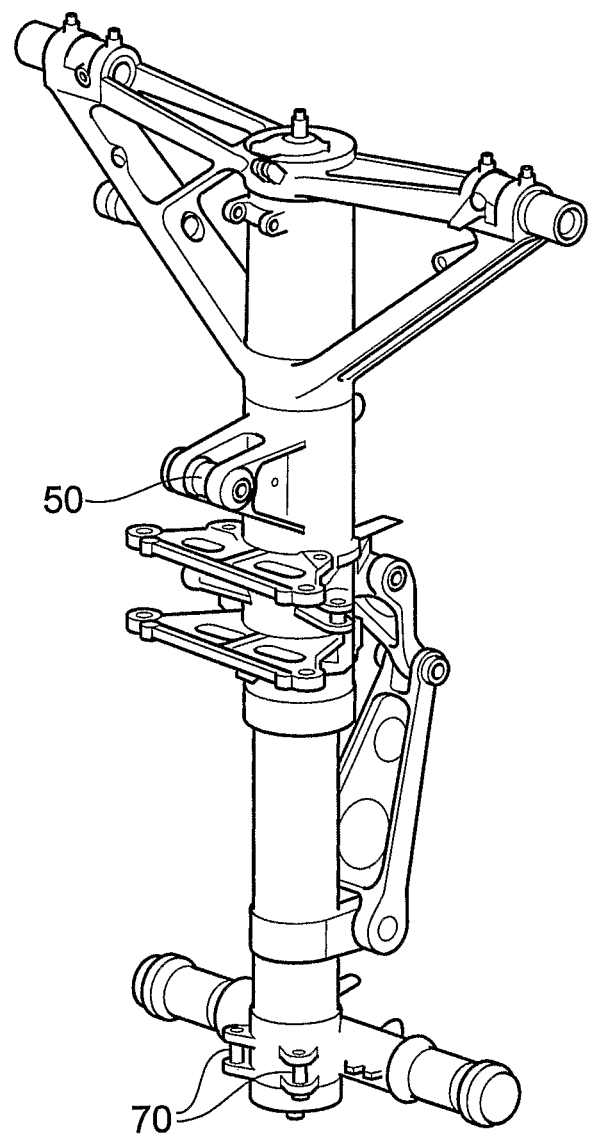
FIG. 5 is a view of an aircraft towing device.

The shear pin has been shown in the example above as a pivot pin in an articulation link, but a similar shear pin may be provided in other parts of a landing gear, for example as shown in FIGS. 4 and 5, the shear pin can be used as a side stay pivot pin 40 or a drag stay pivot pin (not shown) to indicate if a lower load limit has been exceeded before the main pivot pin fails at a designed upper load limit. Also, the pin need not be limited to use as a pivot member. For example, it can also be used as a diaphragm pin 60 retaining an internal part of the shock absorber within the outer casing to react a load proportional to the inner pressures and to shear at a predetermined load limit.

Instead of being positioned in a landing gear, the shear pin may be positioned in some other part of an aircraft which is subjected to landing forces, such as a tail skid.

Furthermore, the shear pin assembly can be used in an aircraft towing device, as shown at 70 in FIG. 5. In this case the shear pin is subjected to aircraft towing forces, and can be inspected to determine whether the towing forces have exceeded a preset level which may be a lower warming level below a higher failure level at which other shear pins are designed to fail and release the load.

Although the shear pin has been illustrated for use on a winged aircraft, it may also be used on other aircraft such as a helicopter.

In the examples shown, the cavity 25 is filled with a red dye. In alternative embodiments, the red dye may be replaced by another liquid indicator, by another flowable indicator such as a powder, or by an expanding foam.

The invention claimed is:

1. A load indicator comprising a load bearing assembly of first and second load bearing members connected together to bear a lateral load applied to the first member, wherein the first load bearing member defines a cavity with the second load bearing member such that it is frangible above an indicator load, and the cavity contains a flowable indicator which escapes from the cavity once the first load bearing member is fractured by said load, wherein the first load bearing member is tubular and receives the second load bearing member within the first load bearing member so that the first and second load bearing members engage via lands at opposite ends and are spaced apart in a central region to form the cavity, the second load bearing member being arranged to continue to support said load following the first load bearing member being fractured by said load.

2. A load indicator as claimed in claim 1 in which a portion of the first load bearing member is of a reduced thickness to render it frangible and to define the cavity.

3. A load indicator as claimed in claim 2 in which both load bearing members comprise cylindrical members arranged concentrically.

4. A load indicator as claimed in claim 1 in which the cavity includes an internal volume within the second load bearing member.

5. A load indicator as claimed in claim 1 configured as a load bearing pin to connect two components and to bear a load applied between the two components.

6. An assembly of two components and a load indicator configured as a load bearing pin as claimed in claim 1, the pin engaging a pair of lugs on one component in alignment with the lands, and a lug on the other component which lies between the pair of lugs, so as to be loaded by a lateral load when the first and second components are loaded in compression or tension.

7. An assembly as claimed in claim 6 in which the two components comprise components of an aircraft landing gear.

8. An assembly as claimed in claim 7 in which the two components comprise members of a side stay or an articulation joint or a towing connection.

9. A method of detecting a hard landing of an aircraft using a load indicator as claimed in claim 1.

10. A method of detecting an overload force in towing an aircraft using a load indicator as claimed in claim 1.

11. A load indicator as claimed in claim 1 in which the flowable indicator is an indicator liquid.

* * * * *

UNITED STATES PATENT AND TRADEMARK OFFICE
CERTIFICATE OF CORRECTION

PATENT NO.        : 8,539,843 B2                                        Page 1 of 1
APPLICATION NO.   : 12/678970
DATED             : September 24, 2013
INVENTOR(S)       : Inns et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this

Fifteenth Day of September, 2015

Michelle K. Lee
*Director of the United States Patent and Trademark Office*